(12) United States Patent
Tsujishita et al.

(10) Patent No.: US 6,993,309 B2
(45) Date of Patent: Jan. 31, 2006

(54) NOISE REMOVAL APPARATUS AND AN FM RECEIVER

(75) Inventors: Masahiro Tsujishita, Tokyo (JP); Masayuki Tsuji, Tokyo (JP); Kenichi Taura, Tokyo (JP); Masayuki Ishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 904 days.

(21) Appl. No.: 09/949,755

(22) Filed: Sep. 12, 2001

(65) Prior Publication Data

US 2002/0055346 A1 May 9, 2002

(30) Foreign Application Priority Data

Nov. 9, 2000 (JP) .............................. 2000-341833

(51) Int. Cl.
*H04B 1/10* (2006.01)
(52) U.S. Cl. ................... 455/296; 455/63.1; 381/94.1
(58) Field of Classification Search ............... 455/63.1, 455/67.13, 295–298, 570, 501, 506, 65; 381/13, 381/94.1, 94.3, 94.7, 94.8, 71.1
See application file for complete search history.

(56) References Cited

U.S. PATENT DOCUMENTS

| | | | | | |
|---|---|---|---|---|---|
| 4,314,377 A | * | 2/1982 | Kondo et al. | ............... | 455/223 |
| 5,432,854 A | * | 7/1995 | Honjo et al. | .................. | 381/10 |
| 5,630,217 A | * | 5/1997 | Matsumoto | .................. | 455/222 |
| 5,903,853 A | * | 5/1999 | Sano | .......................... | 455/570 |

FOREIGN PATENT DOCUMENTS

| | | |
|---|---|---|
| EP | 0103917 A1 | 3/1984 |
| EP | 1120919 A2 | 8/2001 |
| JP | A63169129 | 7/1988 |
| JP | A2283129 | 11/1990 |
| JP | 11088207 A | 3/1999 |

* cited by examiner

*Primary Examiner*—Fan Tsang
*Assistant Examiner*—Aung T. Win
(74) *Attorney, Agent, or Firm*—Birch, Stewart, Kolasch & Birch, LLP

(57) ABSTRACT

A noise removal unit mounted on a car radio according to the invention removes multipath noise and pulse noise from FM demodulated signals. At this time, the noise removal unit removes all of the multipath noise. Also, in case where the generation density of noise is high, the noise removal unit reduces the detection sensitivity so as not to detect pulse noise, particularly of small level, as noise. Comparing to multipath noise, pulse noise is noise rendering a large correction error than multipath noise. Therefore, in case where the generation density of pulse noise is high, by adapting the unit not to remove pulse noise of small level, it is made possible to reduce distortion of the FM demodulated signals to a minimum. Accordingly, it is made to reduce deterioration of the quality of FM voices to a minimum.

23 Claims, 14 Drawing Sheets

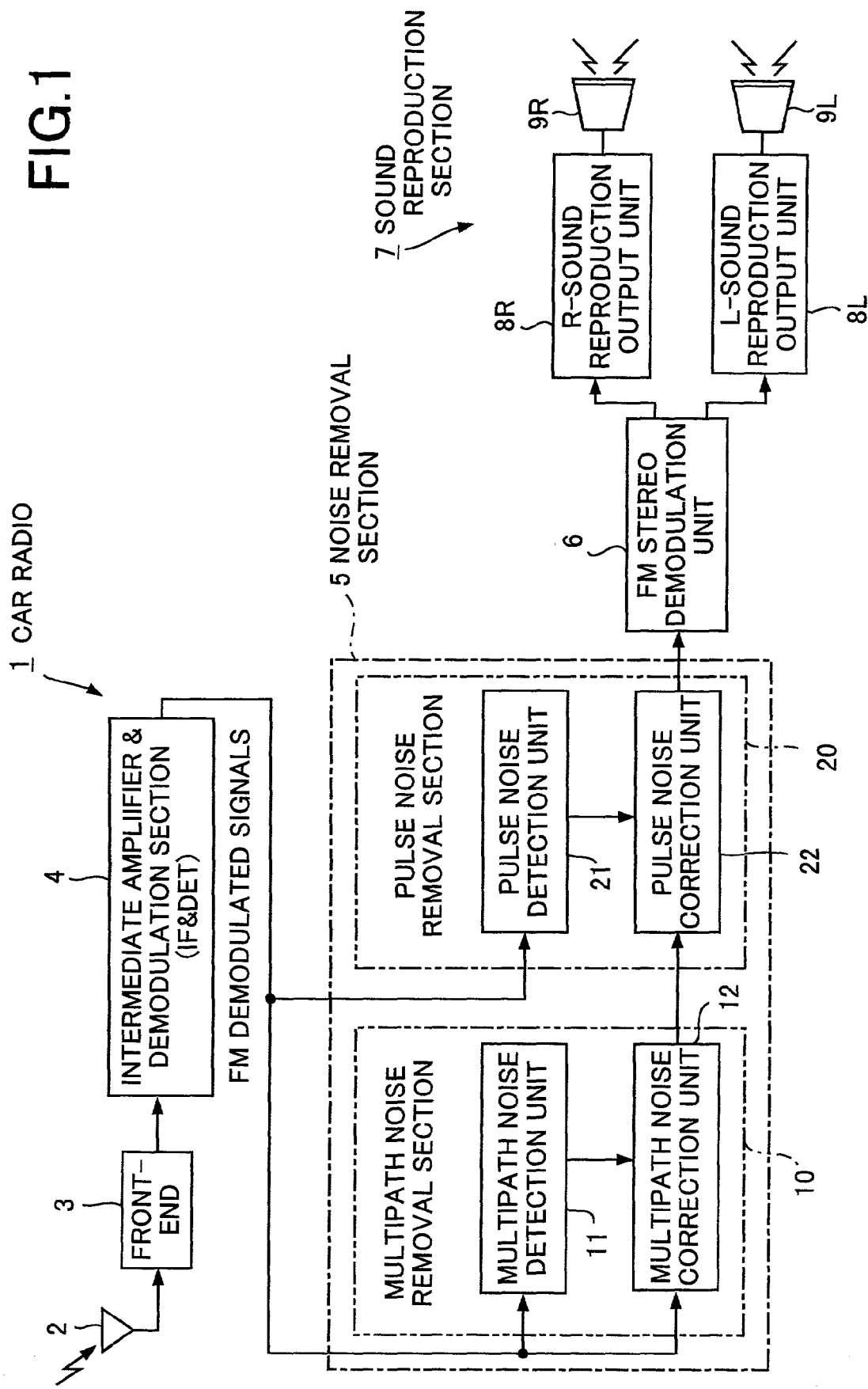

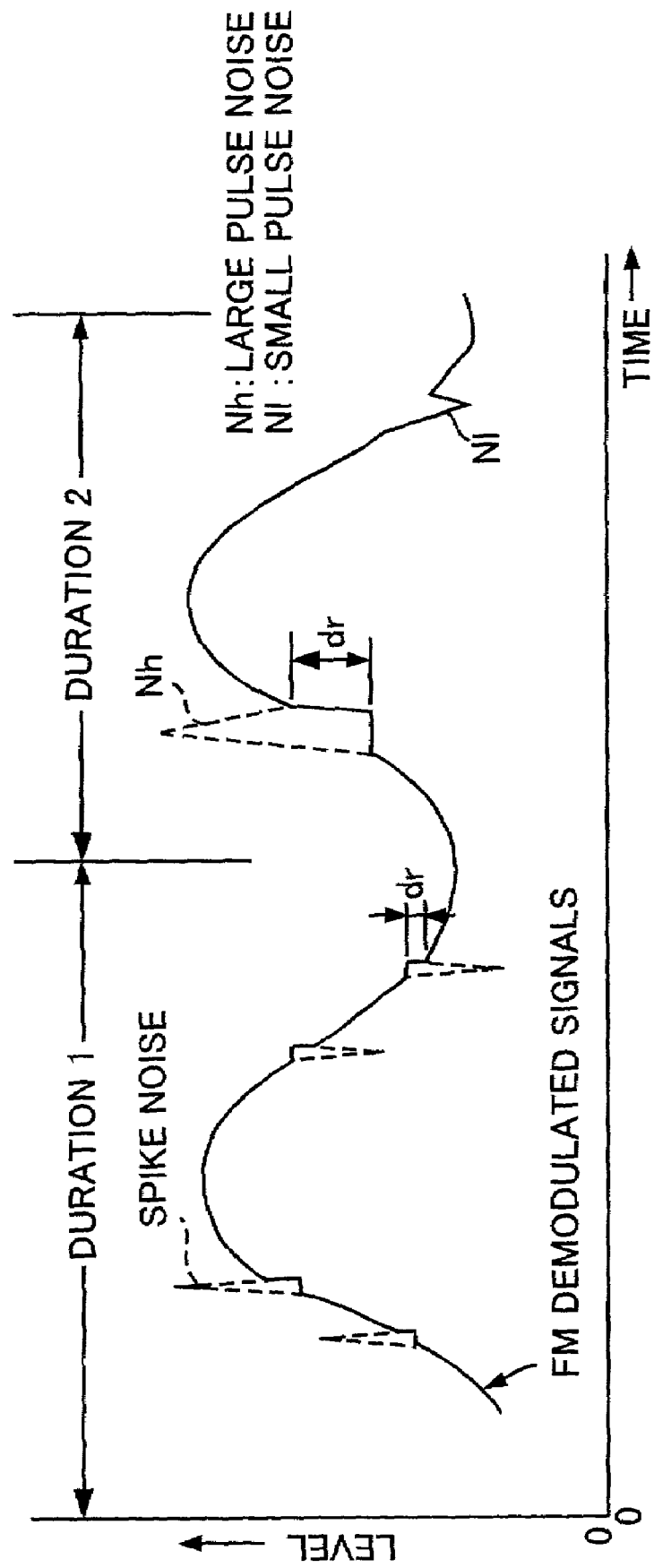

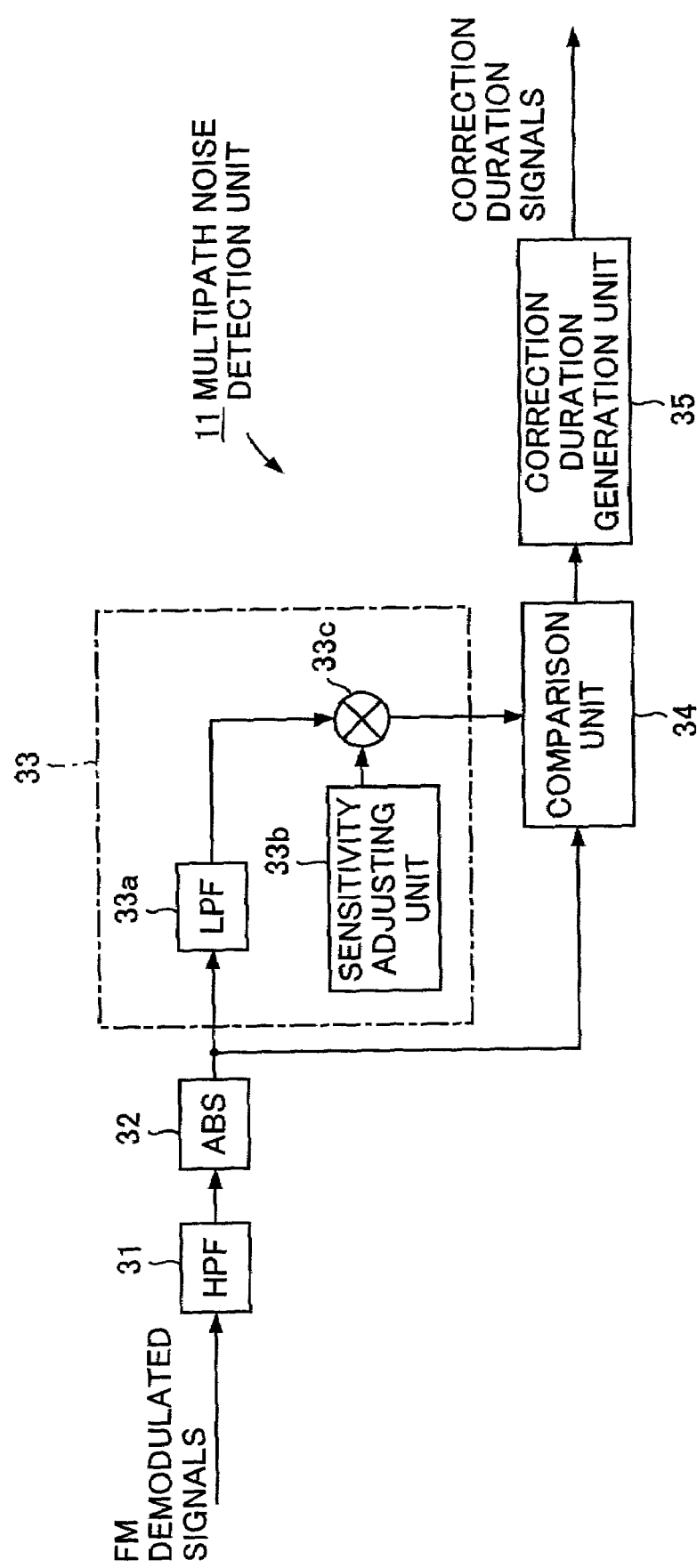

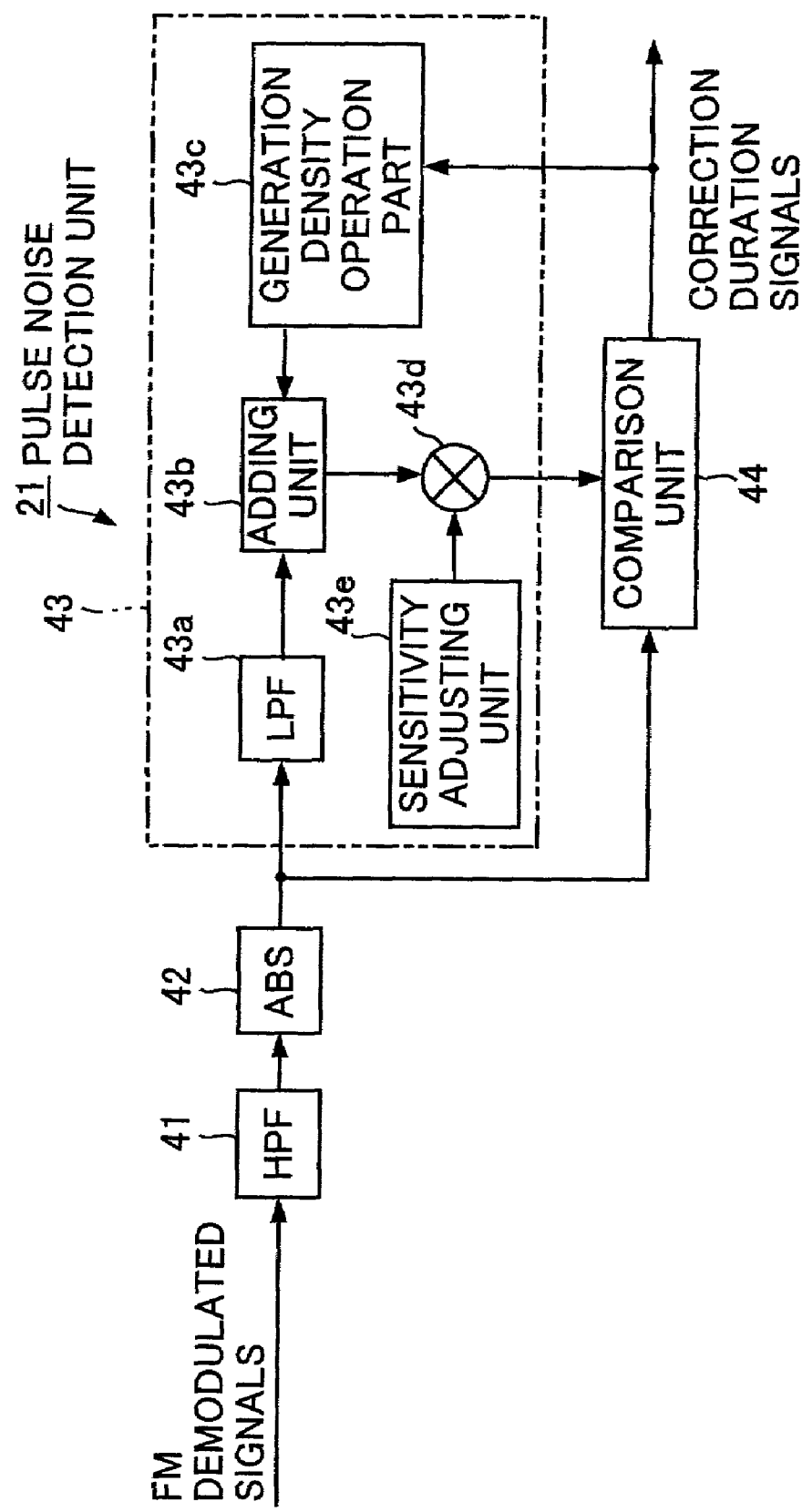

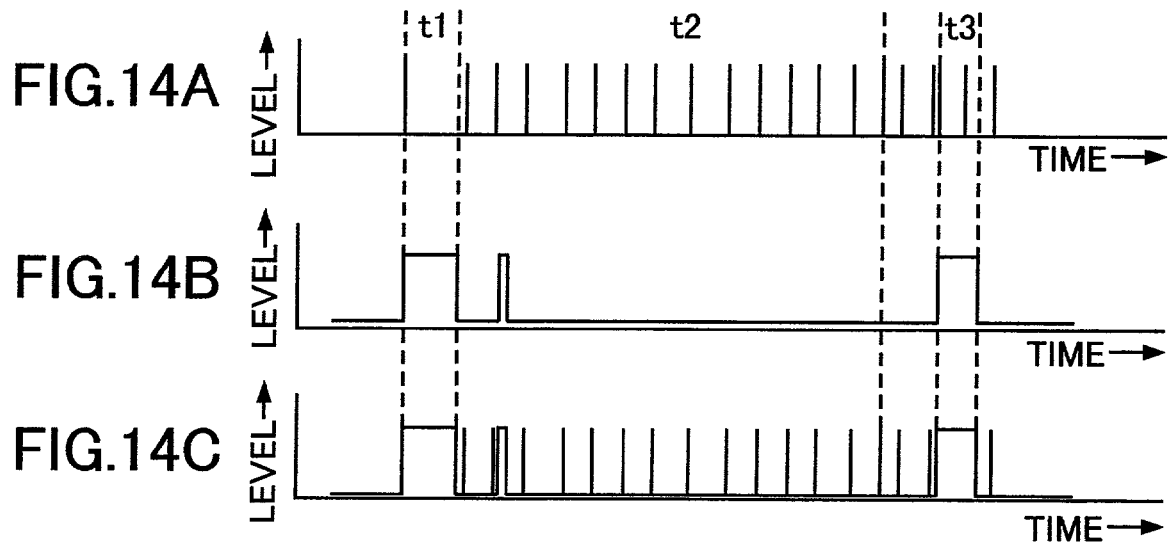
FIG. 14A
FIG. 14B
FIG. 14C
FIG. 15
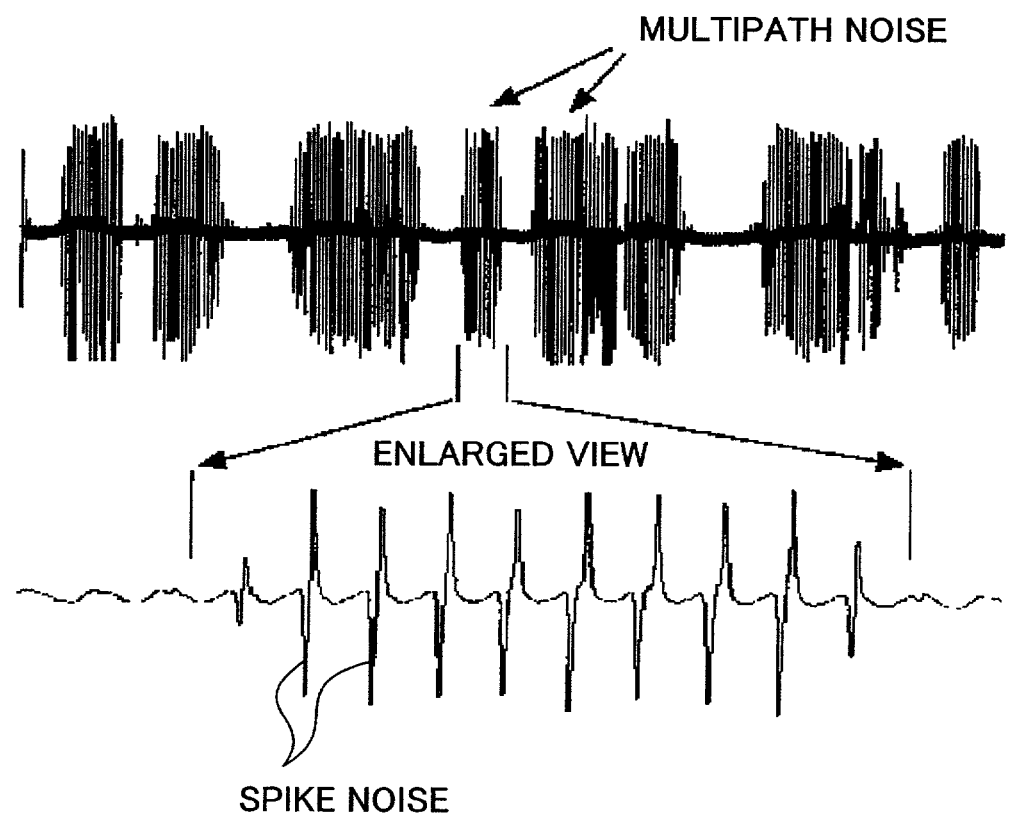
MULTIPATH NOISE
ENLARGED VIEW
SPIKE NOISE

NOISE REMOVAL APPARATUS AND AN FM RECEIVER

BACKGROUND OF THE INVENTION

1. Field of the Invention

The present invention relates to a noise removal apparatus equipped in car radios etc. for removing noise such as multipath noise and pulse noise from received radio signals, and an FM receiver provided with the same.

2. Background Art

Conventionally, radio receivers are equipped with a noise removal apparatus for removing noise from received radio signals. For example, in car radios mounted on automobiles, as the received radio signals sometimes include multipath noise, these car radios are provided with an apparatus for removing these multipath noise.

Multipath noise is caused by the fact that carrier radio signals are reflected by reflecting objects such as mountains or high-rise buildings. To describe the same more concretely, this multipath noise is generated by the fact that when a direct wave transmitted from a radio station and a reflected wave reflected by a reflecting object are interfered each other and received by a car radio, due to phase difference between the direct wave and the reflected wave, a part of the direct wave is eliminated by the reflected wave. In such a case, the quality of the reproduced voice by the car radio is reduced.

Multipath noise is, as shown in FIG. 15; upper diagram, represented by the envelopes when viewed macroscopically. Whereas, when it is viewed microscopically, as shown in FIG. 15; lower diagram, it is understood that they are aggregates of drastically changing spike-like noise. Therefore, multipath noise have a higher frequency relative to the radio signals.

Consequently, in conventional car radios, multipath noise is removed by removing high frequency elements from radio signals with a LPF (Low Pass Filter) etc. Also, in car radios that are able to make stereo demodulation, multipath noise is removed by removing high frequency stereo elements from received radio signals with a LPF etc. to left monaural elements only.

However, even when these technologies are applied, it was difficult to remove multipath noise sufficiently. That is to say, depending on various situations, sometimes a large high frequency multipath noise is generated exceeding an assumption value. In such a case, even when the high frequency elements are simply removed or converted into monaural, uncleared noise is still remained.

Now, different from such a way that multipath noise is removed to the full by simply cutting the frequency with an LPF etc., it is conceivable to detect noise themselves and remove the relevant noise. To describe the same more in detail, according to the proposed technique, high frequency elements are extracted from received radio signals with an HPF (High Pass Filter) etc. As multipath noise is of higher frequency relative to radio signals, it is possible to detect multipath noise with this processing. After that, correction processing is made on detected multipath noise for a period of generation duration of each spike-like noise. That is to say, for a period of generation duration of the spike-like noise, values immediately before the same or compensation values are output. By virtue of this manner, it is made possible to remove multipath noise.

By the way, radio signals include not only multipath noise but also pulse noise. Pulse noise is represented by spark plug noise and motored mirror noise. Same as multipath noise, frequency of the same is higher relative to radio signals by nature. Therefore, when high frequency elements are extracted from radio signals with an HPF as the manner of proposed technique, not only multipath noise but pulse noise is also detected. Accordingly, in the proposed technique, both multipath noise and pulse noise is removed without being differentiated from each other.

Pulse noise have, ordinarily, longer generation duration relative to multipath noise by nature. Accordingly, even when this pulse noise is removed, as its generation density is low, there is no particular problem. However, depending on various situations, there may be a case when pulse noise is generated frequently. In such case, there exists such a problem that large correction errors are generated frequently and output voice signals are largely distorted resulting in deterioration of the voice quality.

FIG. 16A is a diagram illustrating radio signals including multipath noise; FIG. 16B is a diagram illustrating radio signals including pulse noise having relatively long generation frequency; FIG. 16C is a diagram illustrating radio signals including multipath noise having relatively short generation frequency.

Generation duration Δt of each spike-like noise constituting multipath noise is, as shown in FIG. 16A, relatively short. On the contrary, generation duration Δt of pulse noise is, as shown in FIG. 16B and FIG. 16C, relatively long. Accordingly, when pulse noise is removed, comparing to a case where multipath noise is removed, the distortions of radio signals become greater than the distortion thereof.

To describe the same more in detail, when spike-like noise is removed, a portion of FM demodulated signals from which the noise is removed becomes as shown with a broken line in FIG. 16. In this case, the correction error dr, which is a difference between an original value and a corrected value, is, as shown in FIG. 16A, relatively small. On the contrary, when pulse noise is removed, as shown in FIG. 16B, the correction error dr becomes relatively large. Accordingly, when pulse noise is removed, comparing to a case where multipath noise is removed, a large influence is rendered to the deterioration of the voice quality.

However, as shown in FIG. 16B, in case where the generation frequency is relatively long, the deterioration of quality still remains within allowable range. Whereas, in case where the generation frequency is relatively short, large correction errors dr occur frequently and a large distortion is rendered to the radio signals resulting in a drastic deterioration of the voice quality.

SUMMARY OF THE INVENTION

The present invention provides a noise removal apparatus which is able to reduce distortion of received radio signals such as FM demodulated signals to a minimum. Also, the invention provides an FM receiver which is able to reduce deterioration in quality of FM voices to a minimum by utilizing an aforementioned noise removal apparatus.

In order to achieve the above-mentioned themes, according to the invention, the noise removal apparatus comprises a first detection unit for detecting noise included in received radio signals as noise of less than a predetermined upper limit duration, a second detection unit for detecting noise while altering the noise detecting sensitivity in response to the generation status of the noise included in the received radio signals and a correction section for removing noise detected by the first and the second detection units from the received radio signals.

According to the structure of the invention, the noise removal apparatus detects noise included in received radio signals as noise of less than upper limit duration and removes noses, while the same alters the detection sensitivity in response to the generation status of the noise and removes noise. Accordingly, noise of less than the upper limit duration are all removed. Whereas, numbers of noise to be removed can be controlled by altering the detection sensitivity in response to the generation status of the noise. As a result, it is made possible to prevent a large correction error from occurring frequently. Consequently, it is made possible to reduce distortion of the received radio signals to a minimum.

BRIEF DESCRIPTION OF THE DRAWINGS

A preferred form of the present invention is illustrated in the accompanying drawings in which:

FIG. 1 is a block diagram illustrating a structure of a car radio provided with a noise removal apparatus according to a first embodiment of the present invention;

FIG. 2 is a diagram illustrating an FM demodulated signals after noise removal;

FIG. 3 is a block diagram illustrating an internal structure of a multipath noise detection unit;

FIG. 5 is a block diagram illustrating an internal structure of a pulse noise detection unit;

FIG. 14 is a diagram illustrating waveform of each part of the noise removal apparatus according to fourth embodiment;

FIG. 15 is a diagram illustrating a structure of a multipath noise;

DETAILED DESCRIPTION OF THE PREFERRED EMBODIMENTS

Figure 4A:
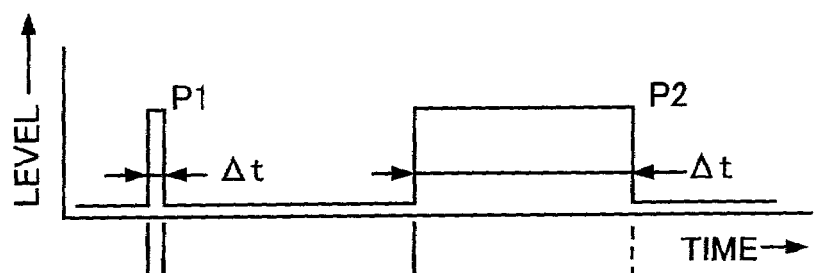
FIG. 4 is a diagram illustrating a noise removal process in the multipath noise removal section.

Hereinafter, referring to the drawings, a detailed description will be made as to an embodiment of the present invention.

First Embodiment

FIG. 1 is a block diagram illustrating a structure of a car radio provided with a noise removal apparatus according to a first embodiment of the present invention. This car radio 1 is one of radio receiving apparatus mounted on a mobile object, i.e., an automobile, which enables FM stereo voices to be reproduced by receiving FM (Frequency Modulation) stereo radio signals (hereinafter, referred to as FM radio signals) and demodulating the same. To describe the same more in detail, this car radio 1 includes a receiving antenna 2, a front-end 3, an intermediate amplifier•demodulation section (IF & DET) 4, a noise removal section 5, an FM stereo demodulation unit 6, a sound reproduction output unit 7 and speakers 8.

FM radio signals (received radio signals) received by the receiving antenna 2 are forwarded to the front-end 3. The front-end 3 amplifies the same to a high frequency and then converts the same into a medium frequency. FM radio signals converted into a medium frequency are forwarded to the intermediate amplifier•demodulation section 4. The intermediate amplifier•demodulation section 4 amplifies the FM radio signals of medium frequency, and then demodulates the same. As a result, FM demodulated signals are obtained. The FM demodulated signals are forwarded to the noise removal section 5.

The noise removal section 5 removes noise from the FM demodulated signals. To describe the same more concretely, the noise removal section 5 removes multipath noise and pulse noise from the FM demodulated signals. The noise removal section 5 removes all multipath noise. However, it removes pulse noise partially in response to the noise generation status except those which causes a large correction error if they are removed. To describe the same in other words, the noise removal section 5 removes all multipath noise and also removes pulse noise by reducing the number of the pulse noise to be removed in case that frequency pulse noise occur. To describe the same in further other words, the noise removal section 5 is adapted to remove all multipath noise and also is adapted so as not to determine the pulse noise of relatively small level as noise in case where the density of the pulse noise exceeds a specific level. By virtue of this manner, the noise removal section 5 reduces distortion of FM demodulated signals to a minimum. After noise removal, the FM demodulated signals are forwarded to the FM stereo demodulation unit 6.

The FM stereo demodulation unit 6 separates R-signal and L-signal from the FM demodulated signals and forwards these R-signal and L-signal to the sound reproduction output unit 7. The sound reproduction output unit 7 includes an R-sound reproduction output unit 8R, a L-sound reproduction output unit 8L, a speaker for R-sound 9R and a speaker for L-sound 9L. The R-signal and L-signal are forwarded to the R-sound reproduction output unit 8R and the L-sound reproduction output unit 8L respectively. The reproduction units 8R and 8L for R-sound and L-sound forward R-signal and L-signal to a speaker 9R for R-sound and a speaker 9L for L-sound respectively. As a result, voices are reproduced from the speaker for R-sound 9R and the speaker for L-sound 9L respectively.

A description will be made as to the noise removal section 5 further in detail. The noise removal section 5 is provided with a multipath noise removal section 10 and a pulse noise removal section 20. The multipath noise removal section 10 is for the purpose of removing multipath noise. In this case, the multipath noise removal section 10 removes not only multipath noise while distinguishing the multipath noise from the pulse noise, but also it detects both multipath noise and pulse noise included within the FM demodulated signals as noise in less than a predetermined multipath upper limit duration $\Delta tm$ and removes the same. The multipath upper limit duration $\Delta tm$ is preset equal to an average generation duration of each spike-like noise comprising multipath noise, or a slightly longer than the same. Therefore, all of multipath noise is removed, while as for pulse noise which have a generation duration sufficiently longer than spike-like noise, a part of the same only is removed.

The pulse noise removal section 20 is for the purpose of removing pulse noise. To describe the same further concretely, the pulse noise removal section 20 removes mainly pulse noise from which only a part thereof has been removed by the multipath noise removal section 10. In this case, the pulse noise removal section 20 does not remove all noise in any case but removes noise while altering the detection sensitivity in response to the noise generating status. To describe the same more concretely, the pulse noise removal section 20 removes large level noise only by altering the detection sensitivity in response to the generation density of noise. By virtue of this manner, distortion in the FM demodulated signals is reduced to a minimum. Accordingly, deterioration of voice quality is reduced to a minimum.

To describe the same more in detail, the multipath noise removal section 10 is provided with a multipath noise detection unit 11 and a multipath noise correction unit 12. Also, the pulse noise removal section 20 is provided with a pulse noise detection unit 21 and a pulse noise correction unit 22. The multipath noise detection unit 11 and the pulse noise detection unit 21 are hardware made of logic circuits respectively. Both of the multipath noise correction unit 12 and the pulse noise correction unit 22 provide a part of the function carried out in accordance with a specific computer program within, for example, a DPS (Digital Signal Processor). The FM demodulated signals are forwarded to the multipath noise detection unit 11, the multipath noise correction unit 12 and the pulse noise detection unit 21 in parallel. The FM demodulated signals output by the multipath noise correction unit 12 are forwarded to the pulse noise correction unit 22.

The multipath noise detection unit 11 assumes that all noise included in the FM demodulated signals have a generation duration of the aforementioned multipath upper limit duration $\Delta tm$ or less and detects the same. To describe the same in other words, the multipath noise detection unit 11 limits every generation duration $\Delta t$ of the multipath noise and the pulse noise included in the FM demodulated signals to the multipath upper limit duration $\Delta tm$ or less and detects a correction duration $\Delta tc$. To describe in further other words, the multipath noise detection unit 11 assumes that multipath noise and pulse noise are all multipath noise and detects their generation duration $\Delta t$ or multipath upper limit duration $\Delta tm$ as the correction duration correction duration $\Delta tc$.

The multipath noise detection unit 11 extracts high frequency elements from the FM demodulated signals and detects high frequency elements of which duration is larger than a first threshold th1. At this time, when the duration of the high frequency elements of the first threshold th1 or larger is the aforementioned multipath upper limit duration $\Delta tm$ or larger, the duration is compressed to aforementioned multipath upper limit duration $\Delta tm$.

The multipath upper limit duration $\Delta tm$, for example, is a duration a little longer than an average generation duration of spike-like noise. To describe the same more in detail, in many cases, as spike-like noise is more or less extended during passing through the front-end 3 and the intermediate amplifier•demodulation section 4, the multipath upper limit duration $\Delta tm$ is preset to a value in which an average duration of the spike-like noise is added with a duration (an imaginary value or experimental value) extended during passing through the circuit.

Therefore, the correction duration $\Delta tc$ is ordinarily detected as a value equal to the multipath upper limit duration $\Delta tm$. Also, the correction duration $\Delta tc$ is ordinarily compressed to the aforementioned multipath upper limit duration $\Delta tm$. The multipath noise detection unit 11 forwards a correction duration signals which represent the detected correction duration $\Delta tc$ to the multipath noise correction unit 12.

The multipath noise correction unit 12 removes noise detected by the multipath noise detection unit 11 from the FM demodulated signals. To describe the same more concretely, the multipath noise correction unit 12 corrects the FM demodulated signals for a period of correction duration $\Delta tc$ given by the multipath noise detection unit 11. To describe further concretely, the multipath noise correction unit 12 permits the FM demodulated signals to pass through as it is when it is not correction duration, i.e., non-correction duration. Whereas, when it is correction duration, for example, the multipath noise correction unit 12 outputs a value immediately prior to start of a correction duration as the FM demodulated signals for a period of aforementioned correction duration. By virtue of this manner, at least as to multipath noise, all of the same are removed. While, as to pulse noise, only a part of the same is removed.

The pulse noise detection unit 21 detects noise while altering the noise detection sensitivity in response to the generation status of the noise included in the FM demodulated signals. To describe the same in other words, the pulse noise detection unit 21 alters the noise detection sensitivity in response to generation density, generation cycle or generation frequency of the noise included in the FM demodulated signals, and detects the generation duration $\Delta t$ of the noise as the correction duration $\Delta tc$. To describe in further other words, when the generation density of the noise included in the FM demodulated signals is high, the pulse noise detection unit 21 decreases the noise detection sensitivity for the densely generated noise and detects the same.

The pulse noise detection unit 21 extracts high frequency elements from the FM demodulated signals and detects a duration of which high frequency elements are of a second threshold th2 or more as the correction duration $\Delta tc$. In this case, the pulse noise detection unit 21 alters the second threshold th2 in response to the generation status of the high frequency elements in the FM demodulated signals and selects the objects to be detected as noise. To describe the same concretely, when the generation density of the noise is relatively low, the pulse noise detection unit 21 alters the second threshold th2 to a relatively small value. Whereas, when the generation density of the noise is relatively high, the pulse noise detection unit 21 alters the second threshold th2 to a relatively large value.

Therefore, as to multipath noise in which spike-like noise is generated densely, only a part of the actual generation duration $\Delta t$ is detected as the correction duration $\Delta tc$. Also, as to pulse noise of which generation density is relatively low, the pulse noise detection unit 21 detects the whole actually generated duration $\Delta t$ as the correction duration $\Delta tc$. Further, as to pulse noise of which generation density is relatively high, as same as the multipath noise, the pulse noise detection unit 21 detects only a part of the actually generated duration $\Delta t$ as the correction duration $\Delta tc$. The pulse noise detection unit 21 forwards correction signals, which represents this detected correction duration Δtc, to the pulse noise correction unit 22.

The pulse noise correction unit 22 removes noise detected by the pulse noise detection unit 21 from the FM demodulated signals. To describe the same in other words, the pulse noise correction unit 22 removes noise from the FM demodulated signals for a period of correction duration Δtc given by the pulse noise detection unit 21. To describe the same further concretely, when it is not a correction duration, i.e., for a period of non-correction duration, the pulse noise correction unit 22 permits the FM demodulated signals output from the multipath noise correction unit 12 to pass through as it is. Whereas, for a period of a correction duration, for example, the pulse noise correction unit 22 outputs a value of the FM demodulated signals immediately before start of the correction duration Δtc as the FM demodulated signals for a period of the aforementioned correction duration Δtc.

FIG. 2 is a diagram illustrating the FM demodulated signals after noise removal. When spike-like noise is generated densely as indicated with a broken line in the duration 1, in the noise removal section 5, all spike-like noise, i.e., multipath noise is removed owing to the function of the multipath noise removal section 10. Whereas, in the duration 2, when pulse noise is generated densely, in the noise removal section 5, pulse noise of relatively high level pulse noise Nh only are removed owing to the function of the pulse noise removal section 20. That is to say, when pulse noise is generated densely, pulse noise of relatively low level pulse noise Nl are not removed. By virtue of this structure, it is made possible to prevent large correction errors dr from being generated frequently. As a result, it is made possible to reduce distortion of the FM demodulated signals to a minimum.

FIG. 3 is a block diagram illustrating an internal structure of the multipath noise detection unit 11. The multipath noise detection unit 11 has HPF 31, ABS (ABSolute) 32, a first threshold generation section 33, a comparison unit 34 and a correction duration generation unit 35. The FM demodulated signals are forwarded to the HPF 31. The HPF 31 extracts high frequency elements from the FM demodulated signals and outputs. When noise overlaps with the FM demodulated signals, as the relevant noise is of high frequency, it means that the HPF 31 extracts noise. In this case, in response to the noise level; i.e., large or small, the level of the high frequency elements becomes large or small. The high frequency elements extracted by the HPF 31 are forwarded to the ABS 32.

The ABS 32 converts the high frequency elements into absolute values. To describe the same more concretely, the ABS 32 converts one polarity elements into another polarity elements. The reason of this is to make it possible to detect noise with one first threshold th1. The high frequency elements converted into absolute values by the ABS are forwarded to both of the first threshold generation section 33 and the comparison unit 34.

A first threshold generation section 33 generates first threshold th1 based on an average value of the high frequency elements converted into absolute values. To describe the same more concretely, the first threshold generation section 33 is provided with an LPF 33a. The LPF 33a extracts an average value of the high frequency elements. The average value of the high frequency elements output from the LPF 33a is multiplied by a sensitivity coefficient output from a sensitivity adjustment unit 33b at a multiplier unit 33c. Thus, a first threshold th1 is generated. The sensitivity coefficient is preset so that the first threshold th1 is positioned between floor noise emitted from ordinary electronic devices or the like and multipath noise as well as pulse noise. To describe the same concretely, the sensitivity coefficient is a fixed value that makes an average value of the high frequency elements; for example, 1–5 times value of the same. The first threshold th1 generated by the first threshold generation section 33 is forwarded to the comparison unit 34.

The comparison unit 34 compares the high frequency elements forwarded from the ABS 32 and the first threshold th1, and extracts high frequency elements of which level is more than the first threshold th1. To describe the same in other words, the comparison unit 34 extracts duration of which level is more than the first threshold th1 from the high frequency elements. To describe the same further concretely, the comparison unit 34 outputs detection duration signals of which level is H-level when the level thereof is first threshold th1 or more; and is L-level when the level thereof is less than first threshold th1. The detection duration signals output from the comparison unit 34 are forwarded to a correction duration generation unit 35.

The correction duration generation unit 35 generates correction duration signals based on the detection duration signals output from the comparison unit 34. To describe the same more concretely, the correction duration generation unit 35 monitors the H-level duration within the detection duration signals output from the comparison unit 34, and determines whether the relevant H-level duration is longer than the aforementioned multipath upper limit duration Δtm or not. In case where the H-level duration is the multipath upper limit duration Δtm or less, the correction duration generation unit 35 outputs the H-level duration as it is as the H-level value. Whereas, in case where the H-level duration is longer than the multipath upper limit duration Δtm, the correction duration generation unit 35 compresses the H-level duration to multipath upper limit duration Δtm and outputs the same. Therefore, the correction duration generation unit 35 outputs correction duration signals of which every H-level duration is the multipath upper limit duration Δtm or less.

Figure 4B:
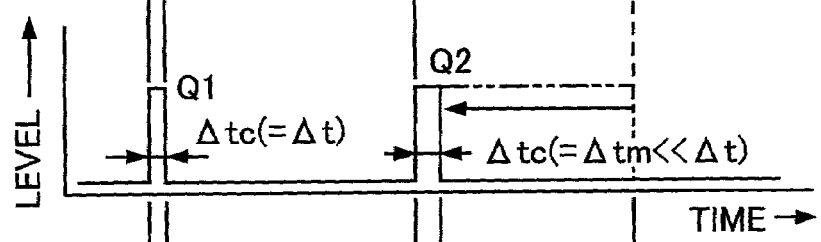

FIG. 4A shows detection duration signals output from the comparison unit 34; FIG. 4B shows correction duration signals output from the correction duration generation unit 35. When the comparison unit 34 detects a multipath noise, as shown in FIG. 4A, the comparison unit 34 outputs the generation duration Δt as H-level P1. In this case, as the H-level P1 is, ordinarily, the multipath upper limit duration Δtm or less, the correction duration generation unit 35 outputs, as shown in FIG. 4B, H-level Q1 of which duration is the same as the H-level P1.

Whereas, when the comparison unit 34 detects a pulse noise, as shown in FIG. 4A, the comparison unit 34 outputs the generation duration Δt as H-level P2. In this case, as the H-level P2 is longer enough than the multipath upper limit duration Δtm, the correction duration generation unit 35, as shown in FIG. 4B, outputs H-level Q2 for a period equal to the multipath upper limit duration Δtm. That is to say, the correction duration generation unit 35, as to a pulse noise, compresses the generation duration Δt to the multipath upper limit duration Δtm.

Figure 4C:
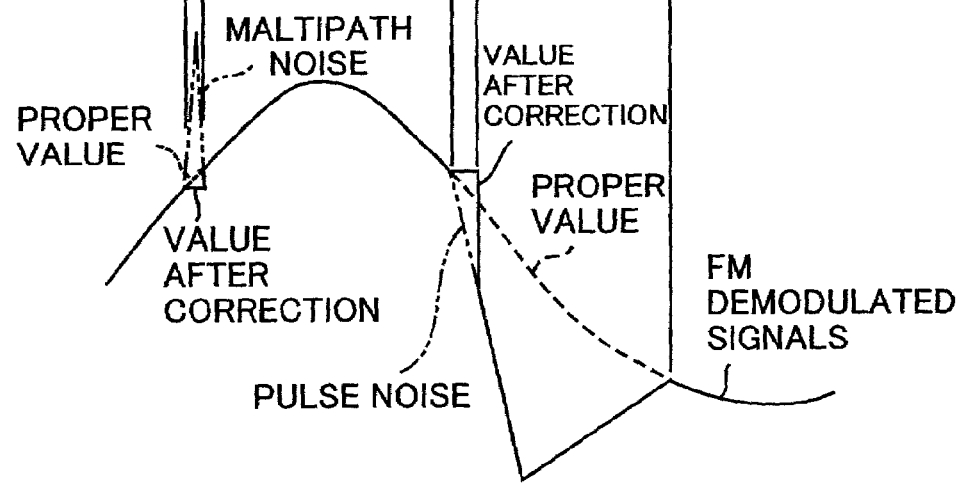

In this way, when the correction duration Δtc is detected, the multipath noise correction unit 12, for example, corrects the FM demodulated signals based on a previously held value. To describe the same more in detail, for example, when a multipath noise is detected by the multipath noise detection unit 11 as shown in FIG. 4C with a chain double-dashed line, the multipath noise correction unit 12, as indicated in FIG. 4C with a solid line, holds a value of the FM demodulated signals immediately before start of the correction duration Q1 for a period of the relevant correction duration Q1. As a result, the FM demodulated signals at the position where a multipath noise overlaps with the same becomes as shown with a solid line. Accordingly, multipath noise is completely removed.

Further, when a pulse noise indicated with a chain double-dashed line in FIG. 4C is detected by the multipath noise detection unit 11, the multipath noise correction unit 12 holds a value of the FM demodulated signals immediately before start of the correction duration Q2 for a period of the relevant correction duration Q2. That is to say, the multipath noise correction unit 12 does not correct the FM demodulated signals for full duration of the generation duration Δt of the pulse noise, but removes the noise from the FM demodulated signals only for the multipath upper limit duration Δtm equivalent to a part of the generation duration. As a result, as to the FM demodulated signals at a position where the pulse noise overlaps with the same, only a part of the pulse noise becomes as indicated with a solid line, and after that, it becomes as indicated with a solid line.

FIG. 5 is a block diagram illustrating an internal structure of the pulse noise detection unit 21. The pulse noise detection unit 21 is equipped with a HPF 41, an ABS 42, a second threshold generation section 43 and a comparing unit 44. FM demodulated signals are forwarded to the HPF 41. The HPF 41 extracts high frequency elements from the input FM demodulated signals. That is to say, the HPF 41 extracts both of the multipath noise elements and the pulse noise elements. The extracted high frequency elements are forwarded to the ABS 42. The ABS 42 converts the high frequency element into an absolute value in order to detect the noise generation duration based on only one second threshold th2. The high frequency elements converted into absolute values are forwarded to a second threshold generation section 43 and a comparing unit 44.

The second threshold generation section 43 creates a second threshold th2 based on an average value of the high frequency elements and the noise generation density. The created second threshold th2 is forwarded to the comparing unit 44. The comparing unit 44 compares the level of the high frequency element and the second threshold th2, and detects duration of more than second threshold th2 or more within the high frequency elements. To describe the same more concretely, the comparing unit 44 outputs a correction duration signal, which is H-level when it is more than the second threshold th2 or more; and is L-level when it is less than the second threshold th2.

The pulse noise detection unit 21 provides the second threshold th2 as a variable threshold corresponding to the noise generation density. To describe the same more in detail, the second threshold generation section 43 includes an LPF 43a. The LPF 43a extracts an average value of the high frequency elements output from the ABS 42. The extracted average value of the high frequency elements is forwarded to an adding unit 43b. Also, the second threshold generation section 43 includes a generation density operation part 43c. The generation density operation part 43c calculates a noise generation density D0 based on a correction duration signals output from the comparing unit 44, and obtains a density coefficient Nc based on the calculated noise generation density D0. The density coefficient Nc is forwarded to the adding unit 43b. The adding unit 43b adds the average value of the high frequency elements and the density coefficient Nc, and forwards the added result to a multiplying unit 43d. The multiplying unit 43d further multiplies the added result with a fixed sensitivity coefficient held in a sensitivity adjusting unit 43e, thus a second threshold th2 is obtained.

To describe more in detail as to the second threshold generation section 43, as described hereinbefore, the correction duration signal has an H-level when a noise is generated. Therefore, it is made possible to calculate a noise generation density D0 by checking the number of the H-levels in a specific period of time. Accordingly, the generation density operation part 43c calculates the generation density D0 as described hereinafter to obtain the density coefficient Nc.

Figure 6:
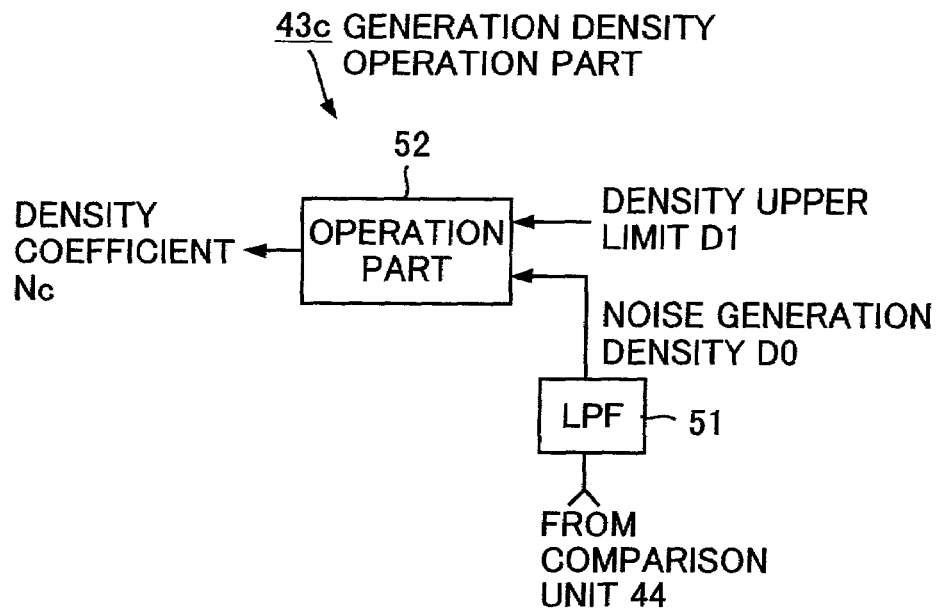
FIG. 6 is a block diagram illustrating an internal structure of a generation density operation part.

FIG. 6 is a block diagram illustrating a internal structure of the generation density operation part 43c. The generation density operation part 43c calculates a generation density D0 based on an average value of the H-levels in a specific duration to obtain an density coefficient Nc corresponding to the generation density D0. To describe the same more concretely, the generation density operation part 43c includes an LPF 51. The LPF 51 is adapted to be forwarded correction duration signals from the comparing unit 44. The LPF 51 obtains a generation density D0 by extracting an average value included in the correction duration signals. The larger number of times of H-levels, that is, the higher generation density, the higher average value is obtained. Accordingly, an average value represents a generation density D0.

A generation density D0 output from the LPF 51 is forwarded to an operation part 52. The operation part 52 is also adapted to be forwarded with a density upper limit value D1. The density upper limit value D1 is preset, for example, to a value which does not permit deterioration of voice quality when the noise generation density exceeds the same. The operation part 52 calculates a density coefficient Nc based on the aforementioned generation density D0 and density upper limit value D1.

Figure 7:
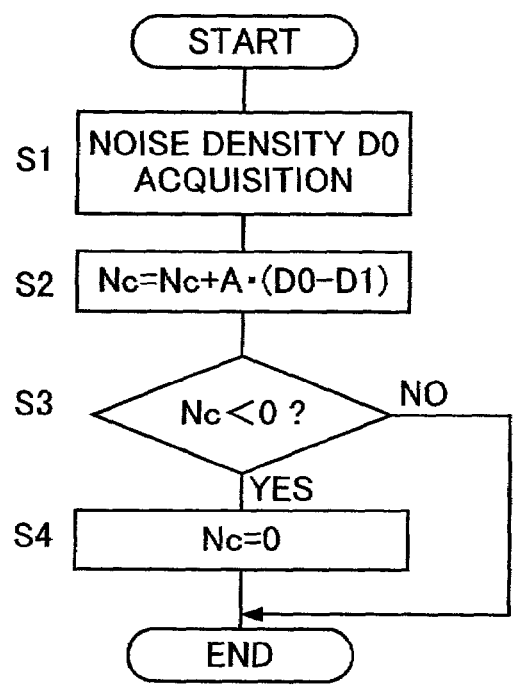
FIG. 7 is a flowchart illustrating a density coefficient operation processing made by an operation part within the generation density operation part.

FIG. 7 is a flowchart for illustrating a density coefficient operation processing made by the operation part 52. When a generation density D0 is forwarded from the LPF 51 (step S1), the operation part 52 calculates a density coefficient Nc (step S2). To describe the same more concretely, the operation part 52 calculates a density coefficient Nc by multiplying a value which is a difference between the generation density D0 and the density upper limit value D1 (D0–D1) by a determined constant A, and further by adding a previous density coefficient Nc to the multiplied result.

After that, the operation part 52 determines whether the obtained density coefficient Nc is smaller than 0 or not (step S3). In case that the density coefficient Nc is smaller than 0, the generation density D0 is relatively low. Therefore, the operation part 52 decides that the density coefficient Nc is 0 (step S4). That is to say, in case that the generation density D0 is relatively low, it is adapted so that the noise generation density is not reflected to the second threshold th2. Whereas, in case that the density coefficient Nc is greater than 0, the generation density D0 is relatively high. Therefore, the operation part 52 decides the obtained density coefficient Nc as the density coefficient Nc as it is. By virtue of this manner, the second threshold th2 becomes a large value. Accordingly, the detection sensitivity becomes low.

As described hereinbefore, in case that a generation density D0 is high, an density coefficient Nc becomes larger in response to the level thereof. Therefore, the second threshold th2 also becomes to be larger. As a result, the number of detected noise becomes smaller. In this case, noise which is not detected as noise is that of low level. That is to say, the fact that density coefficient Nc becomes larger in response to the higher generation density D0 is means that the sensitivity to small noise is reduced.

Accordingly, the frequency of noise detection is reduced. As a result, the generation density D0 becomes to be smaller than the density upper limit value D1. Accordingly, a density coefficient Nc obtained at the step S2 becomes gradually smaller, i.e., the sensitivity becomes gradually higher.

As described hereinbefore, according to the first embodiment of the present invention, in the multipath noise removal section 10, every multipath noise is removed. Whereas, when the noise generation density is high, the pulse noise removal section 20 is adapted so that pulse noise of low level are not removed. Therefore, comparing to a case where every noise is removed, it is made possible to reduce the number of occurrence of large correction errors. Accordingly, it is made possible to reduce the distortion of the FM demodulated signals to a minimum. Whereas, as pulse noise, which are not removed, are noise of small level, even when they are left as they are, they give little influence upon the voice quality. Therefore, it is made possible to reduce deterioration of the voice quality to a minimum.

Figures 8A, 8B, 8C:
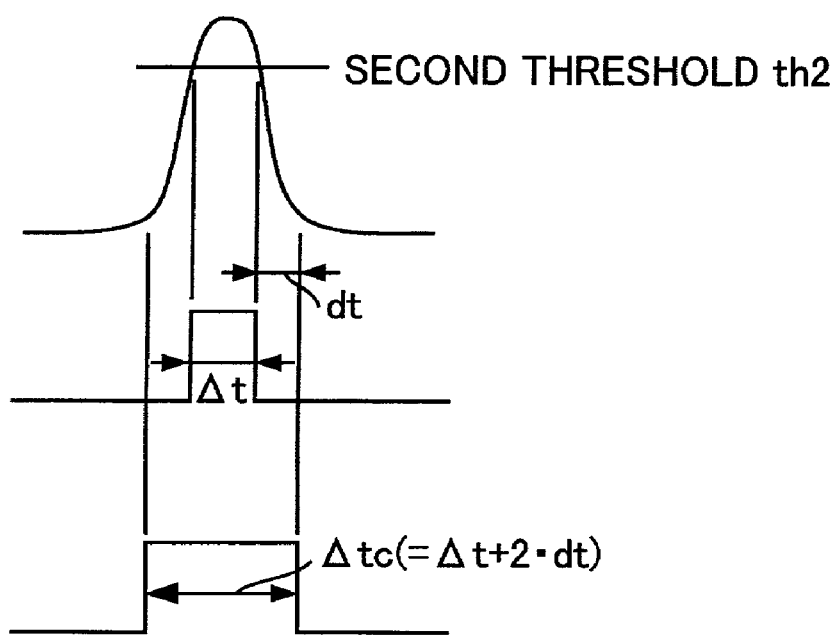
FIG. 8 is a diagram illustrating noise detection processing in the pulse noise detection unit according to another mode of the first embodiment.

Further, in the description hereinbefore, the correction duration $\Delta tc$ detected by the pulse noise detection unit 21 is the duration itself obtained by comparing, as shown in FIG. 8A, a high frequency element with the second threshold th2 at the comparing unit 44. That is to say, the correction duration $\Delta tc$ is, as shown in FIG. 8B, is the duration only that is of second threshold th2 or greater in the high frequency element. However, to describe precisely, as a high frequency element takes relatively long time for rising and trailing by nature, a little smaller level than the second threshold th2 of the high frequency element is also a part of the noise.

Therefore, in order to detect the generation duration $\Delta t$ more precisely, it is conceivable that, as shown in FIG. 8C, as a whole duration, a correction duration $\Delta tc$ can be detected by adding a predetermined additional duration dt in front of and behind a correction duration $\Delta tc$ output from the comparing unit 44 ($\Delta t+2dt$). It is made possible to realize this by, for example, providing a correction duration creation unit behind the comparing unit 44, and by adding an additional duration dt to a generation duration $\Delta t$ output from the comparing unit 44 by the correction duration creation unit. According to this structure, as it is made possible to detect the correction duration more precisely, it is made possible to further increase the voice quality.

Second Embodiment

Figure 9:
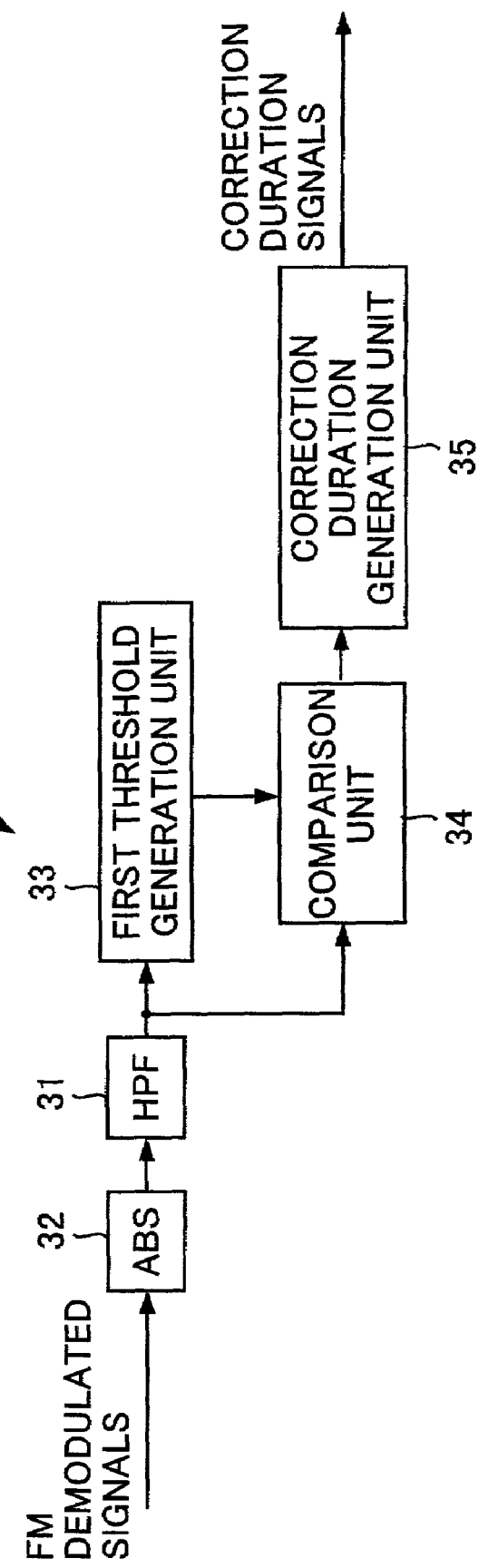
FIG. 9 is a block diagram illustrating an internal structure of the multipath noise detection unit which is a part of the noise removal apparatus according to a second embodiment.

FIG. 9 is a block diagram illustrating an internal structure of the multipath noise detection unit 11 which is a part of the noise removal apparatus according to a second embodiment of the present invention.

In the multipath noise detection unit 11 according to the aforementioned first embodiment, a duration $\Delta t$ itself is detected by the comparison unit 34 as a correction duration $\Delta tc$ of a multipath noise. Whereas, in a multipath noise detection unit 11 according to a second embodiment of the present invention, a duration $\Delta t$ itself detected by the comparison unit 34 is not determined as a correction duration $\Delta tc$ of a multipath noise, but after the detected duration $\Delta t$ is extended to a specific length and then is detected as a final correction duration $\Delta t$.

To describe the same more in detail, the multipath noise detection unit 11 is equipped with an ABS 32, an HPF 31, a first threshold generation section 33, a comparison unit 34 and a correction duration generation unit 35. That is to say, the multipath noise detection unit 11 is constructed as hardware, same as that of the first embodiment except that the ABS 32 and the HPF 31 are positioned in reversed relationship.

FM demodulated signals are forwarded to the ABS 32 and converted into absolute values by the ABS 32. After that, high frequency elements are extracted from the FM demodulated signals by the HPF 31. The high frequency elements are forwarded to the first threshold generation section 33. The first threshold generation section 33 creates a first threshold th1 based on the high frequency elements and forwards the same to the comparison unit 34. The comparison unit 34 compares the level of the high frequency elements and the first threshold th1 and extracts a duration $\Delta t$ of which level is the first threshold th1 or greater. After that, the detected duration $\Delta t$ is extended by the correction duration generation unit 35 and detected as a final correction duration $\Delta tc$.

Figure 10:
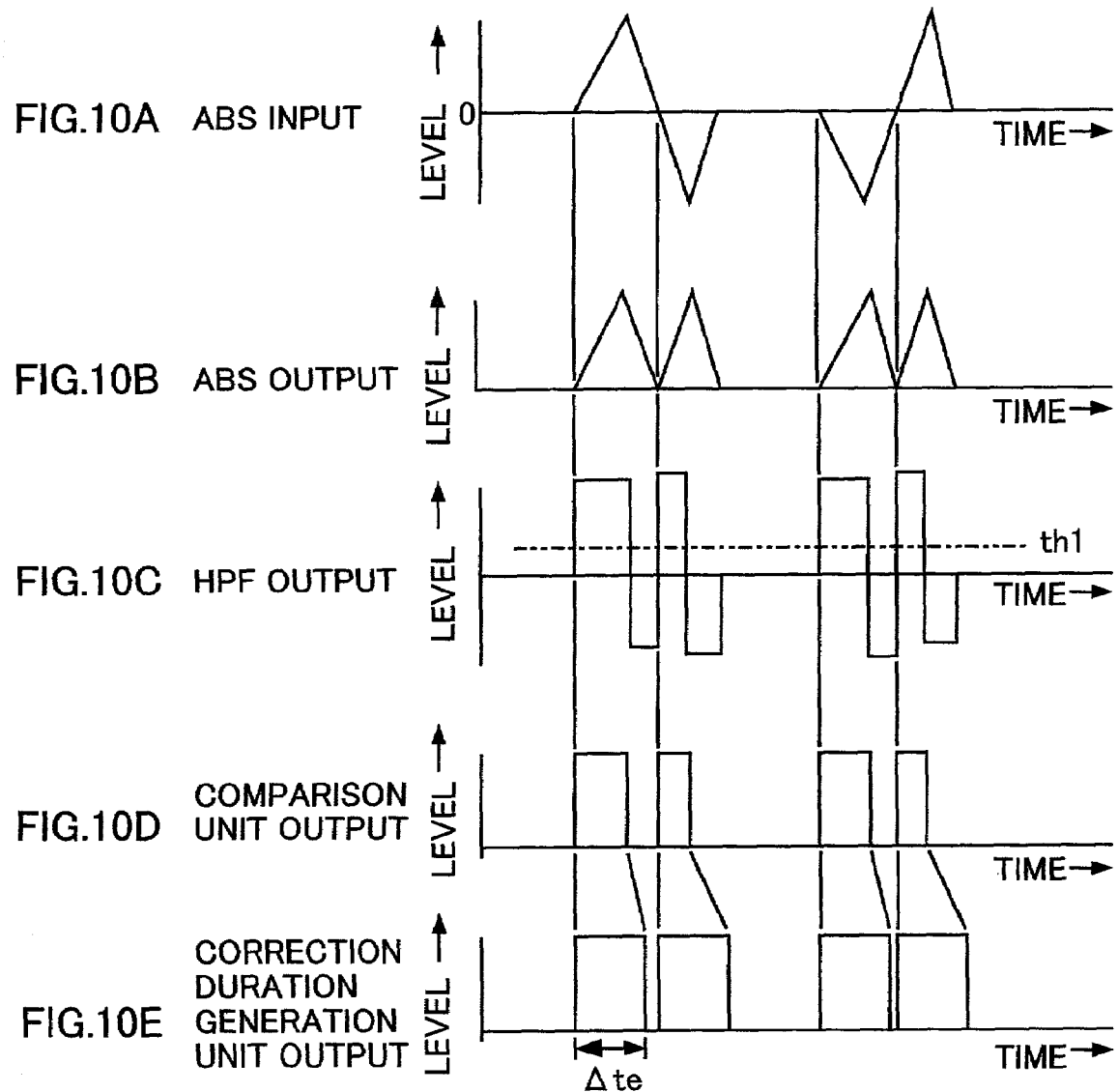
FIG. 10 is a diagram illustrating waveform of each part of the multipath noise detection unit according to the second embodiment.

FIG. 10 is a diagram illustrating waveform of each part of a multipath noise detection unit 11. Multipath noise includes, for example, as shown in FIG. 10A, spike-like noise at the both sides of positive and negative polarities. Therefore, when a multipath noise is converted into an absolute value, in the output from the ABS 32, for example, as shown in FIG. 10B, a negative element is converted into a positive element. And after that, when the output from the ABS 32 is forwarded to the HPF 31, the output from the HPF 31 is, as shown in FIG. 10C, a signal alternating between positive and negative alternatively. Accordingly, by setting the first threshold th1 created by the first threshold generation section 33 to positive, the signals output from the comparison unit 34 are of positive values only, as shown in FIG. 10D.

However, to describe in strictly precise words, generation duration of a multipath noise consists of, as shown in FIG. 10A, a positive duration and a negative duration. Therefore, a generation duration $\Delta t$ of a multipath noise is not fully represented in a strictly precise meaning, by only the signals shown in FIG. 10D. Whereas, based on the signals shown in FIG. 10D, it is impossible to determine the end point of the generation duration of the multipath noise in a strictly precise meaning. Therefore, the correction duration generation unit 35 carries out a process to extend a duration of an H-level output from the comparison unit 34 to a specific duration $\Delta te$ and finally creates a correction duration signal shown in FIG. 10E. By virtue of this manner, it is made possible to make the same closer to the generation duration of a multipath noise in a strictly precise meaning.

As described hereinbefore, according to the second embodiment of the present invention, as a detected duration is extended based on a comparison with the first threshold th1, it is made possible to make the same closer to an actual generation duration $\Delta t$ of multipath noise. Therefore, it is made possible to remove multipath noise better. Accordingly, it is made possible to further increase the quality of FM voices.

Third Embodiment

Figure 11:
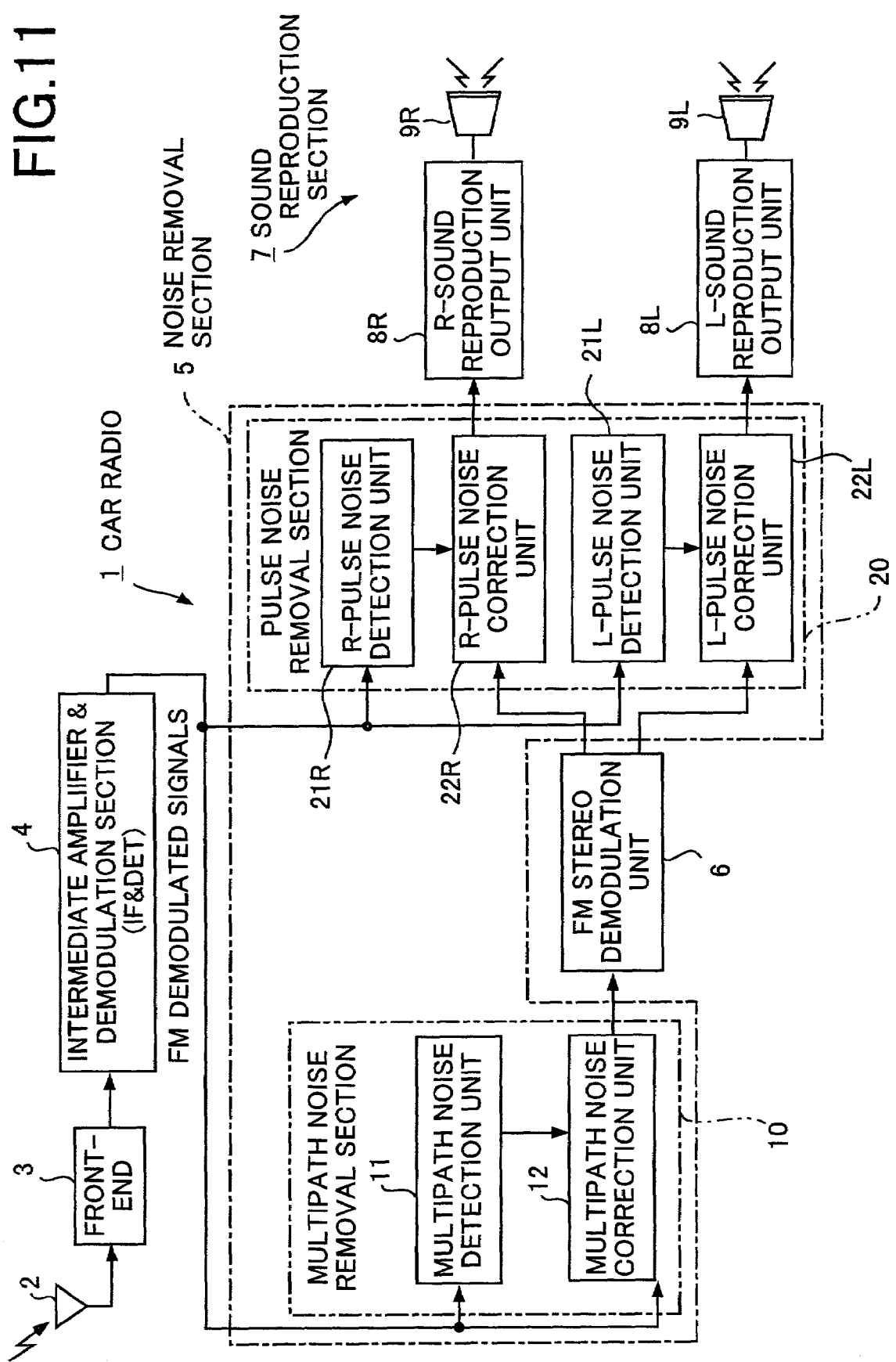
FIG. 11 is a block diagram illustrating a car radio provided with a noise removal apparatus according to a third embodiment.

FIG. 11 is a block diagram illustrating a car radio 1 provided with a noise removal apparatus according to a third embodiment of the present invention. In FIG. 11, parts which have the same function as the parts illustrated in FIG. 1 are given the same reference numerals.

In the first and second embodiments, it is adapted to remove multipath noise and pulse noise first, and then to carry out FM stereo demodulation. Whereas, in a third embodiment, it is adopted to remove multipath noise from FM demodulated signals first, and then to carry out FM stereo demodulation, and then to remove pulse noise therefrom.

To describe the same more in detail, the pulse noise removal section 20 according to the third embodiment comprises a pulse noise removal section designated for R-signal and a pulse noise removal section designated for L-signal. To describe the same more concretely, the pulse noise removal section for R-signal includes a pulse noise detection unit for R-signal 21R and a pulse noise correction unit for R-signal 22R. The pulse noise removal section for L-signal includes a pulse noise detection unit for L-signal 21L and a pulse noise correction unit for L-signal 22L.

An FM stereo demodulation unit 6 is disposed between a multipath noise removal section 10 and a pulse noise removal section 20. To describe the same more concretely, the FM stereo demodulation unit 6 is adapted to be input with FM demodulated signals output from a multipath noise correction unit 12. The FM stereo demodulation unit 6 separates the FM demodulated signals into R-signal and L-signal, and forwards the R-signal and L-signal to the pulse noise correction unit designated for R-signal 22R and the pulse noise correction unit designated for L-signal 22L respectively. Whereas, a pulse noise detection unit designated for R-signal 21R and pulse noise detection unit designated for L-signal 21L detects respectively correction duration Δtc of noise included in the FM demodulated signals, and forwards correction duration signals representing the correction duration Δtc to the pulse noise correction units 22R and the 22L respectively.

The pulse noise correction unit designated for R-signal 22R removes a noise from the R-signal for a period of correction duration Δtc of the noise detected by the pulse noise detection unit designated for R-signal 21R, and forwards the R-signal from which noise has been removed to an R-sound reproduction output unit 8R. As a result, R-voice is output from a speaker for R-sound 9R. Also, the pulse noise correction unit designated for L-signal 22L removes a noise from L-signal for a period of correction duration Δtc of the noise detected by the pulse noise detection unit designated for L-signal 21L and forwards the L-signal from which noise has been removed to an L-sound reproduction output unit 8L. As a result, L-voice is output from an speaker for L-sound 9L.

Figure 12:
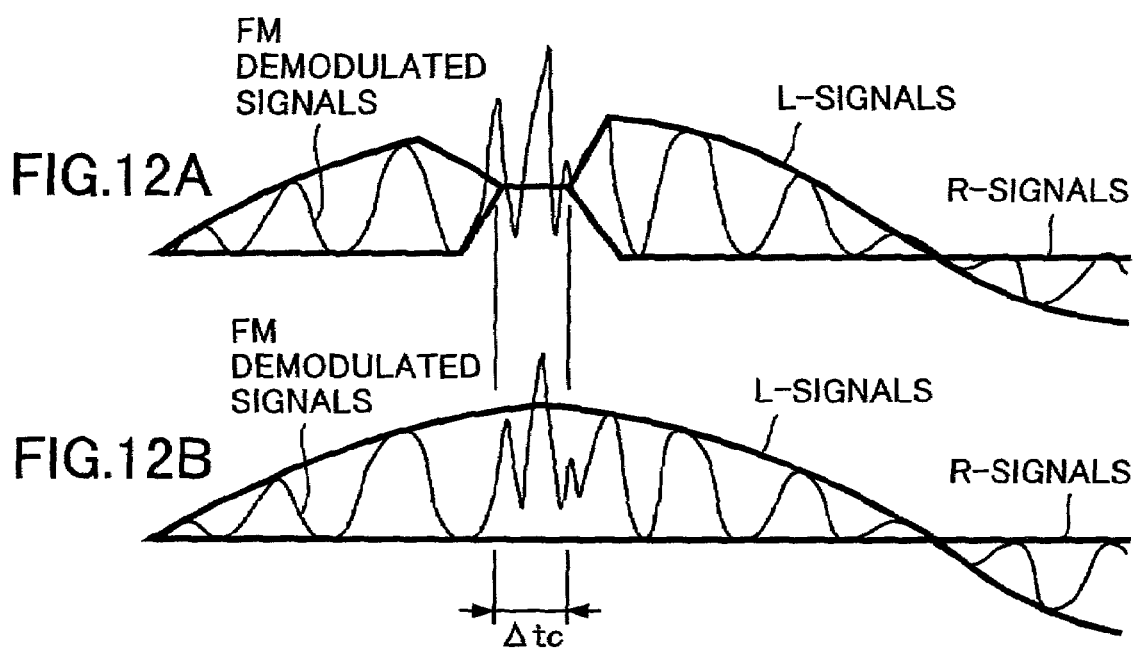
FIG. 12 is a diagram illustrating R-signal and L-signal after noise removal.

FIG. 12A illustrates R-signal and L-signal which have been made FM stereo demodulation after carrying out pulse noise removal process as in the first embodiment. FIG. 12B illustrates R-signal and L-signal which have been carried out pulse noise removal process after carrying out FM stereo demodulation according to the third embodiment.

In case where the FM demodulation process is carried out afterward, both of the R-signal and L-signal are included in the signals before pulse noise is removed. Therefore, the effect of the pulse noise removal is rendered to both of the R-signal and L-signal. Accordingly, the R-signal and L-signal, which have different values respectively by nature, as shown in FIG. 12A, have an identical value during correction duration Δtc of the noise. As a result, the values of the R-signal and L-signal largely deviate from their original values. Accordingly, the quality of voice is deteriorated.

Whereas, in case where the FM demodulation process is carried out beforehand, the signals in carrying out the pulse noise removal processing are independent from the R-signal and L-signal. Therefore, the R-signal and L-signal during correction duration Δtc of the noise, as shown in FIG. 12B, neither of them are largely deviated from its original value. As a result, it is made possible to reduce the deterioration of the voice to a minimum.

As described hereinbefore, according to the third embodiment, as it is adapted to carry out pulse noise removal processing after FM stereo demodulation, it is made possible to remove noise from R-signal and L-signal in good condition. As a result, it is made possible to reduce the deterioration of the voice to a minimum.

Forth Embodiment

Figure 13:
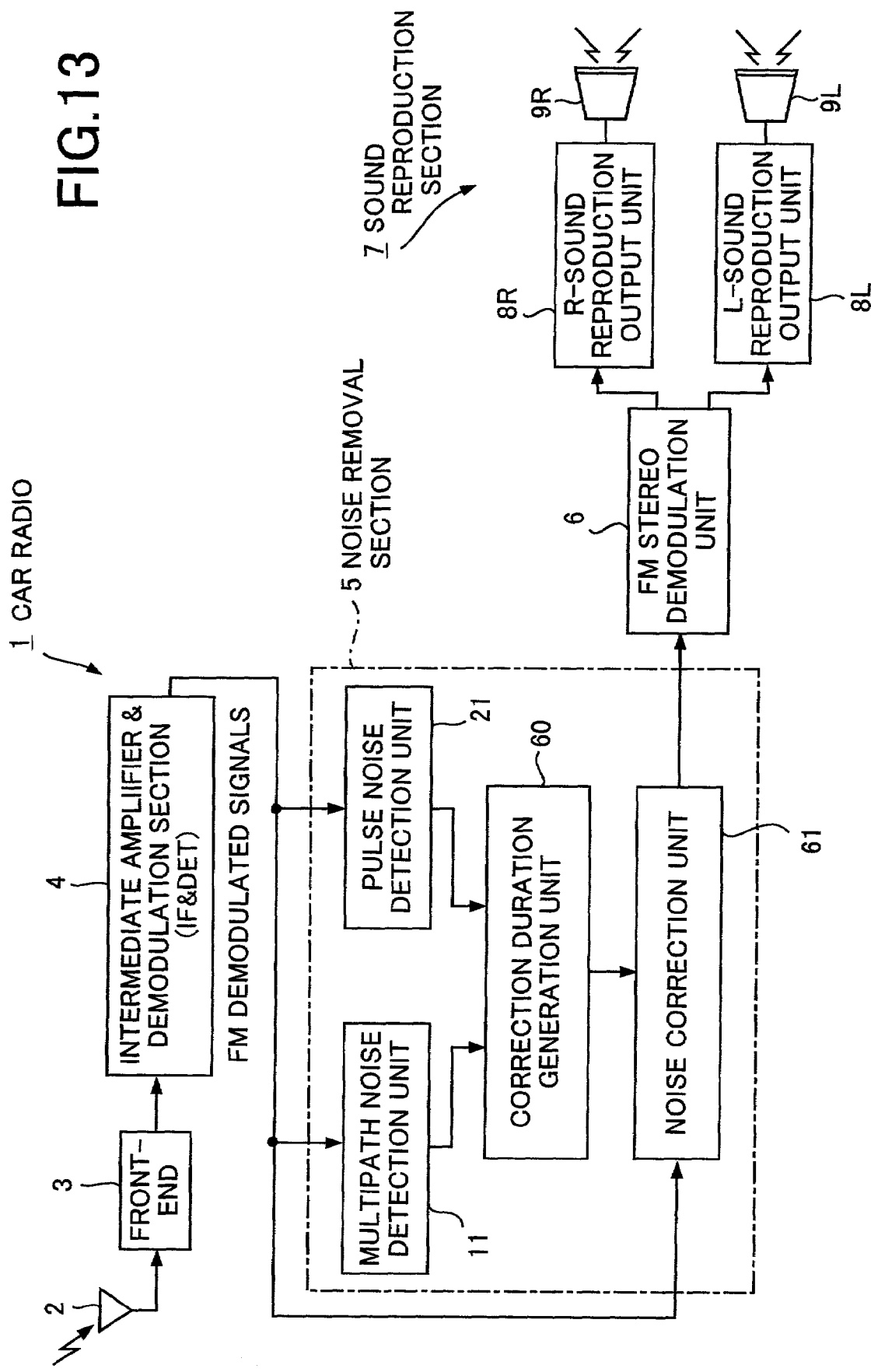
FIG. 13 is a block diagram illustrating a car radio provided with a noise removal apparatus according to a fourth embodiment.
Figure 16A:
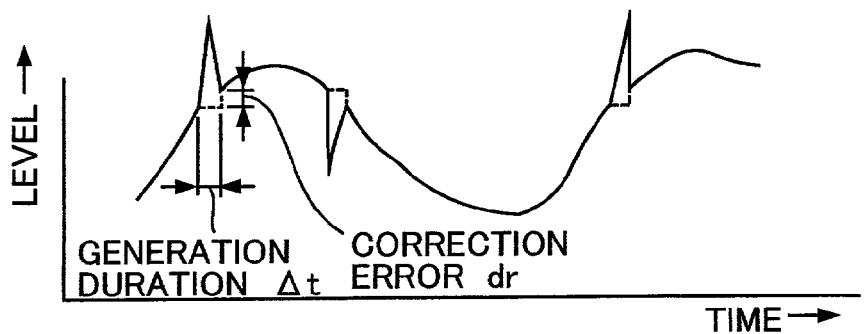
FIG. 16 is a diagram illustrating a structure of a radio signal including a multipath noise and a pulse noise.
Figure 16B:
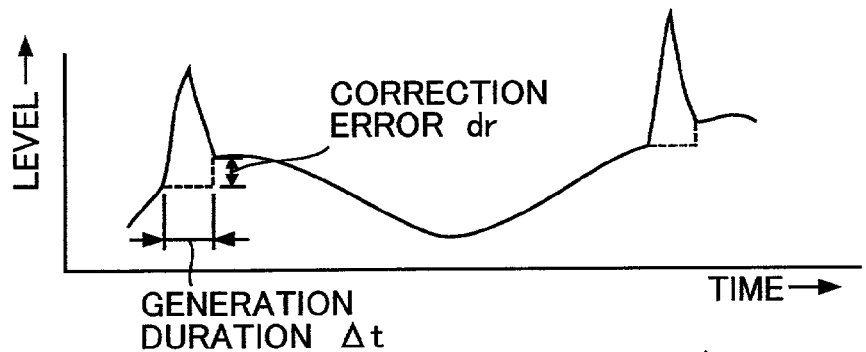
Figure 16C:
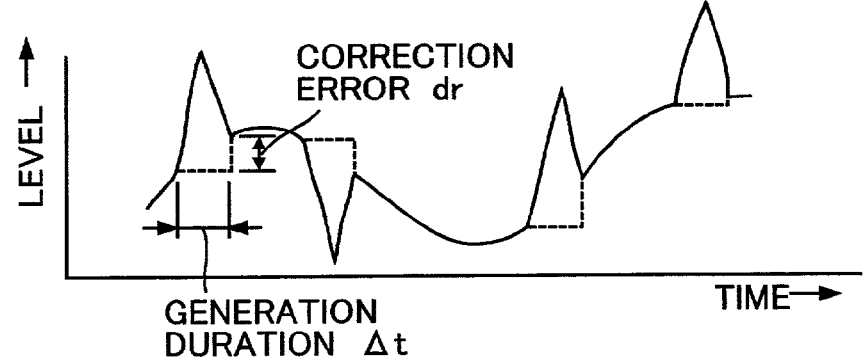

FIG. 13 is a block diagram illustrating a car radio 1 according to a fourth embodiment of the present invention. In FIG. 13, the functions, which are the same as those in FIG. 1, are given identical reference numerals.

In the first embodiment, detection of noise duration and noise correction of multipath noise and pulse noise are carried out in parallel therewith. Whereas, in the fourth embodiment, detection of the correction duration only is carried out in parallel between multipath noise and pulse noise, and the noise correction is carried out commonly.

To describe the same more in detail, the noise removal section 5 according to the fourth embodiment, includes a multipath noise detection unit 11, a pulse noise detection unit 21, a correction duration generation unit 60 and a noise correction unit 61. The multipath noise detection unit 11 and the pulse noise detection unit 21 have the same structure as the multipath noise detection unit 11 and the pulse noise detection unit 21 in the first embodiment respectively. The correction duration generation unit 60 and the noise correction unit 61 are both used commonly to multipath noise and pulse noise. FM demodulated signals are forwarded to the multipath noise detection unit 11, the pulse noise detection unit 21 and the noise correction unit 61.

To describe the same further in detail, the correction duration signals created by the multipath noise detection unit 11 and the pulse noise detection unit 21 are both forwarded to the correction duration generation unit 60. The correction duration generation unit 60 is for generating a final common correction duration signal based on each correction duration signal. To describe the same more concretely, the correction duration generation unit 60 calculates logical sum of each collection duration signal and forwards the resultant logical sum to the noise correction unit 61 as the common correction duration signal. The noise correction unit 61 corrects the FM demodulated signals for a period of correction duration Δtc specified by the forwarded common correction duration signal.

FIG. 14A is a diagram illustrating a correction duration signal output from the multipath noise detection unit 11, FIG. 14B is a diagram illustrating a correction duration signal output from the pulse noise detection unit 21 and FIG. 14C is a diagram illustrating a common correction duration signal output from the correction duration generation unit 60.

The multipath noise detection unit 11 detects not only generation duration Δt of a multipath noise as the correction duration Δtc, but also detects a multipath upper limit duration Δtm which is compressed generation duration Δtc of a pulse noise, as a correction duration Δtc. For example, the multipath noise detection unit 11 detects a noise, in a period of duration t1 in which a pulse noise is generated, as if the noise is generated only in a part of the duration t1. Therefore, the correction duration signal output from the multipath noise detection unit 11 is, as shown in FIG. 14A, short in generation frequency and in duration thereof.

The pulse noise detection unit 21 adjusts the number of the noise to be corrected in accordance with generation density of the noise, and then detects the generation duration Δt of the noise as it is as the correction duration Δtc. That is to say, the pulse noise detection unit 21 reduces the number of the noise to be detected as correction duration Δtc of the noise by setting the second threshold th2 higher when the generation density of the noise is high. Therefore, even when a lot of noise is generated, as shown in FIG. 14A, in a period of the duration t2, the noise in a signal output from the pulse noise detection unit 21 is not determined as noise in the signal thereof as shown in FIG. 14B.

The correction duration generation unit 60 outputs a final common correction duration signal by calculating a logical sum of each correction duration signal output from the multipath noise detection unit 11 and the pulse noise detection unit 21. To describe the same concretely, as shown in FIG. 14C, when either of the correction signals is H-level, the correction duration generation unit 60 determines the same as H-level, and only when both thereof are L-level, the correction duration generation unit 60 determines the same as L-level, and outputs a common correction duration signal.

As described hereinbefore, according to the fourth embodiment, as the function for noise correction is made common, it is made possible to simplify the process.

Another Embodiments

Although several embodiments of the present invention has been described hereinbefore, it is to be understood that the invention is not limited to the embodiments described hereinbefore. For example, a description has been made while taking example from a case where the present invention is applied to a car radio. However, the present invention is applicable to a various kinds of radios such as a radio mounted on a mobile object other than automobiles, or portable radios, etc.

Also, in the embodiment of the present invention, an example is taken from a case where the present invention is applied to demodulate FM stereo radio signals. However, the present invention is also applicable to demodulate FM monaural radio signals. Further, present invention is applicable to radio signals other than FM; for example, to demodulate AM radio signals etc.

What is claimed is:

1. A noise removal apparatus, comprising:
   a first detection unit for detecting noise included in received radio signals as noise of less than a predetermined upper limit duration;
   a second detection unit for detecting the noise while altering the noise detecting sensitivity in response to the generation status of the noise included in the received radio signals; and
   a correction section for removing noise detected by the first and the second detection units from the received radio signals.

2. A noise removal apparatus according to claim 1, in which the first detecting unit includes a unit for obtaining the generation duration of the detected noise included in the received radio signals and a unit for outputting the generation duration as a detection result in case where the obtained generation duration of the noise is the upper limit duration or less, or outputting a relevant upper limit duration as a detection result in case where the obtained generation duration of the noise is longer than the upper limit.

3. A noise removal apparatus according to claim 2, in which the unit for outputting detection results extends the generation duration of the obtained noise to a predetermined length and provides the extended generation duration to be compared with the upper limit duration.

4. A noise removal apparatus according to claim 1, in which the upper limit duration is average generation duration of the spike-like noise included in multipath noise.

5. A noise removal apparatus according to claim 1, in which the first detection unit includes a high pass filter for extracting high frequency elements from the received radio signals, an absolute value unit for converting the high frequency elements extracted by the high pass filter into absolute values, a unit for creating a first threshold based on an average value of the high frequency elements converted into absolute values, a comparison unit for comparing a level of the high frequency elements converted into absolute values with the first threshold and detecting a duration of the first threshold or longer as the generation duration of the noise, and a correction duration generation unit for outputting the generation duration as the correction duration of the noise in case where the generation duration of the noise detected by the comparison unit is the upper limit duration or shorter; or for outputting a relevant upper limit duration as the correction duration of the noise in case where the generation duration of the noise detected by the comparison unit is longer than the upper limit duration.

6. A noise removal apparatus according to claim 1, in which the second detection unit includes a unit for detecting a generation density of the noise and a unit for altering the detection sensitivity by comparing the detected generation density of the noise with a predetermined upper limit density.

7. A noise removal apparatus according to claim 6, in which the unit for altering the detection sensitivity reduces the detection sensitivity in response to the generation density in case where the detected generation density of the noise is higher than the upper limit density.

8. A noise removal apparatus according to claim 1, wherein the second detection unit includes a high pass filter for extracting high frequency elements of the received radio signals, an absolute value unit for converting the high frequency elements extracted by the high pass filter into absolute values, a unit for creating a second threshold based on an average value of the high frequency elements converted into absolute values and a density coefficient obtained in response to the generation density of the noise, and a comparison unit for comparing the high frequency elements converted into absolute values with the second threshold, detecting a duration of the second threshold or longer as the correction duration and outputting a correction duration signal representing the correction duration.

9. A noise removal apparatus according to claim 8, in which the unit for creating the second threshold includes a unit for obtaining a generation density of the noise based on the correction duration signal output from the comparison unit and obtaining a density coefficient which becomes larger in proportion to the generation density of the obtained noise and a unit for creating the second threshold by adding the average value of the high frequency elements and the density coefficient and then multiplying by a predetermined sensitivity coefficient.

10. A noise removal apparatus according to claim 1, in which the correction unit includes a first correction device for removing the noise detected by the first detection unit from the received radio signals and a second correction device for removing the noise detected by the second detection unit from the received radio signals from which a part of noise have been removed by the first correction device.

11. A noise removal apparatus according to claim 1, in which the received radio signals are FM stereo radio signals including R-signal and L-signal, the correction unit includes:
- a first correction device for removing the noise detected by the first detection unit from the FM stereo radio signals; and
- a second correction device for removing the noise separately detected by the second detecting unit from the R-signal and the L-signal, respectively, included in the FM stereo radio signals from which a part of noise have been removed by the first correction device.

12. A noise removal apparatus according to claim 1, in which the correction unit includes a device for detecting final noise by obtaining a logical sum of the noise detected by the first and the second detecting units; and
- a device for removing the detected final noise from the received radio signals.

13. An FM receiver for receiving FM modulated radio signals, comprising:
- a receiving antenna for receiving the FM modulated radio signals;
- a front-end for amplifying the FM radio signals received by the receiving antenna and then converting the same into medium frequency waves;
- an intermediate amplifier-demodulator for amplifying and demodulating the medium frequency wave FM radio signals output from the front-end;
- a noise removal apparatus set forth in claim 1 for removing noise from the FM demodulated signals output by the front-end; and
- a reproduction section for reproducing the FM demodulated signals from which noise have been removed.

14. A noise removal method for radio signals, comprising the steps of:
- (a) detecting, by a first detection unit, noise included in received radio signals as noise of less than a predetermined upper limit duration;
- (b) detecting, by a second detection unit, the noise while altering the noise detecting sensitivity in response to the generation status of the noise included in the received radio signals; and
- (c) removing noise detected by the steps (a) and (b) from the received radio signals.

15. A noise removal method according to claim 14, in which step (a) includes obtaining the generation duration of the detected noise included in the received radio signals and outputting the generation duration as a detection result in case where the obtained generation duration of the noise is the upper limit duration or less, or outputting a relevant upper limit duration as a detection result in case where the obtained generation duration of the noise is longer than the upper limit.

16. A noise removal apparatus according to claim 15, in which the outputting detection results extends the generation duration of the obtained noise to a predetermined length and provides the extended generation duration to be compared with the upper limit duration.

17. A noise removal apparatus according to claim 14, in which the upper limit duration is average generation duration of the spike-like noise included in multipath noise.

18. A noise removal method according to claim 14, in which the step (a) includes high pass filtering for extracting high frequency elements from the received radio signals, converting the high frequency elements extracted by the high pass filtering into absolute values, creating a first threshold based on an average value of the high frequency elements converted into absolute values, comparing a level of the high frequency elements converted into absolute values with the first threshold and detecting a duration of the first threshold or longer as the generation duration of the noise, and outputting the generation duration as the correction duration of the noise in case where the generation duration of the noise detected by the comparison step is the upper limit duration or shorter; or outputting a relevant upper limit duration as the correction duration of the noise in case where the generation duration of the noise detected by the comparison step is longer than the upper limit duration.

19. A noise removal apparatus according to claim 14, in which the step (b) includes detecting a generation density of the noise and altering the detection sensitivity by comparing the detected generation density of the noise with a predetermined upper limit density.

20. A noise removal apparatus according to claim 19, in which the altering the detection sensitivity reduces the detection sensitivity in response to the generation density in case where the detected generation density of the noise is higher than the upper limit density.

21. A noise removal apparatus according to claim 14, wherein the step (b) includes high pass filtering for extracting high frequency elements of the received radio signals, converting the high frequency elements extracted by the high pass filtering into absolute values, creating a second threshold based on an average value of the high frequency elements converted into absolute values and a density coefficient obtained in response to the generation density of the noise, and comparing the high frequency elements converted into absolute values with the second threshold, detecting a duration of the second threshold or longer as the correction duration and outputting a correction duration signal representing the correction duration.

22. A noise removal apparatus according to claim 21, in which the creating the second threshold includes obtaining a generation density of the noise based on the correction duration signal output from the comparison step and obtaining a density coefficient which becomes larger in proportion to the generation density of the obtained noise and creating the second threshold by adding the average value of the high frequency elements and the density coefficient and then multiplying by a predetermined sensitivity coefficient.

23. A noise removal apparatus according to claim 14, in which the step (c) includes removing the noise detected by the step (a) from the received radio signals and removing the noise detected by the step (b) from the received radio signals from which a part of noise has been removed.

* * * * *